United States Patent
Whitley, Jr.

[11] 3,772,057
[45] Nov. 13, 1973

[54] METHOD FOR HOT DIP GALVANIZING TORSION BAR SUSPENSION SYSTEMS FOR TRAILER WHEELS

[76] Inventor: William P. Whitley, Jr., 4525 E. 10th Ln., Hialeah, Fla. 33103

[22] Filed: Mar. 8, 1972

[21] Appl. No.: 232,677

[52] U.S. Cl............... 117/48, 117/114 A, 118/505
[51] Int. Cl............................................. C23c 1/02
[58] Field of Search............. 117/48, 114 A, 114 B, 117/114 C, 114 R; 118/504, 505, DIG. 12

[56] References Cited
UNITED STATES PATENTS

| 690,039 | 12/1901 | Smith | 118/505 |
|---|---|---|---|
| 1,184,315 | 5/1916 | Buch | 117/94 |
| 3,393,597 | 7/1968 | Hoaglund | 118/505 X |
| 3,535,136 | 10/1970 | Beene | 118/504 X |
| 727,010 | 5/1903 | Smith | 118/505 |
| 947,544 | 1/1910 | Haeske | 118/505 |
| 1,159,820 | 11/1915 | Armstrong | 117/48 X |
| 3,226,245 | 12/1965 | Dettling et al. | 118/505 X |
| 3,667,988 | 6/1972 | Horiki | 117/48 X |

*Primary Examiner*—Ralph S. Kendall
*Attorney*—Ernest H. Schmidt

[57] ABSTRACT

A method and means of hot dip galvanizing completely assembled and machined trailer wheel suspension systems as a unit, without affecting machined wheel spindle surfaces, is described. Spindle protective sleeve caps having an interior nut operative to be screw-threaded on the wheel retainer nut threading at the outer end of a wheel spindle enables force-fitting the inner end of the sleeve cap in sealing relation against the suspension arm hub which carries the spindle, so as to completely cover and seal the spindle during unitary hot dip galvanizing of the suspension system.

4 Claims, 3 Drawing Figures

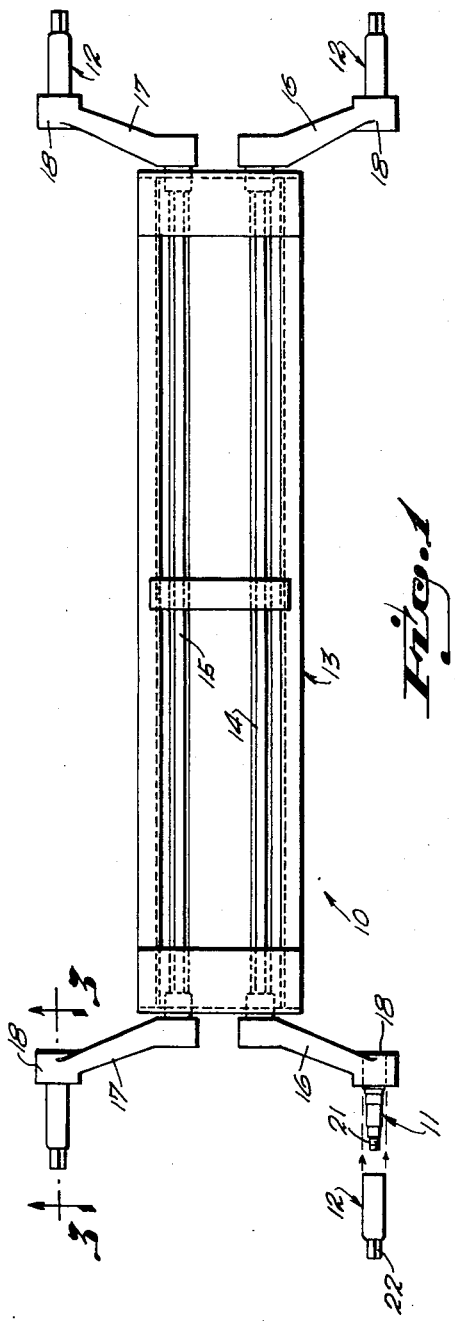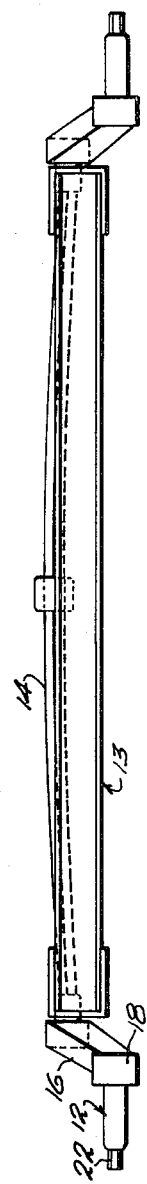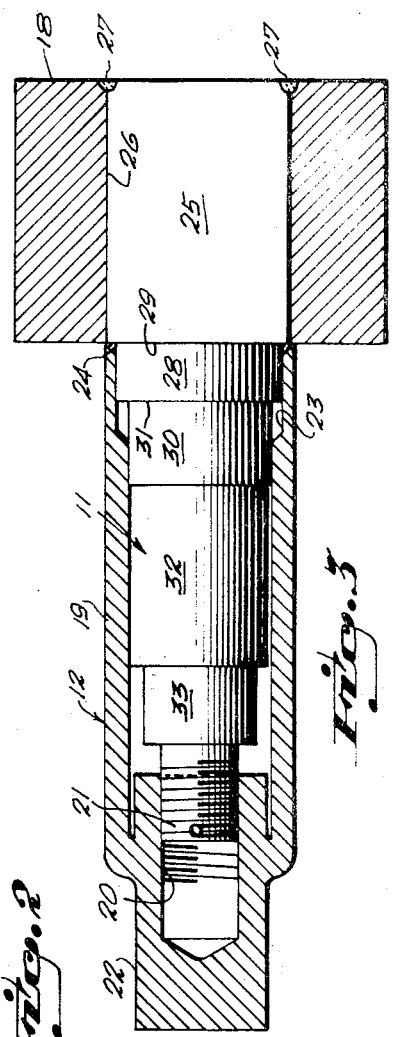

METHOD FOR HOT DIP GALVANIZING TORSION BAR SUSPENSION SYSTEMS FOR TRAILER WHEELS

This invention relates to wheel suspensions for trailers and is directed particularly to a method and means for hot dip galvanizing such suspension system assemblies as a unit without at the same time galvanizing or otherwise affecting the machine-finish surfaces of the wheel spindles thereof.

In my Pat. application, Ser. No. 174,365, filed Aug. 24, 1971, issued Mar. 27, 1973 as U.S. Pat. No. 3,722,908 I describe a torsion bar suspension for tandem wheels for boat trailers and the like and which is particularly well adapted to use with low-slung trailer carriage frames suitable for positioning partially submerged in shallow water with the main trailer boat support surfaces under the water to permit a trailered boat to be floated off the trailer.

Partially submersible trailers having low-slung carriage frames and adaptable to float-on and float-off loading and unloading of a trailered boat have heretofore been devised. Such wheel suspension systems heretofore known, however, notwithstanding elaborate counter-measures, such as painting with rust preventives or the like, have been found to be subject of extensive rusting or corrosion after only a few seasons' use, especially when used in salt water. The rusting and corrosion not only results in an unsightly appearance of the suspension system but also can weaken it to such an extent as to cause impaired spring action and even complete breakdown.

Attempts at hot dip galvanizing completed wheel suspension assemblies to prevent rusting and corrosion have been unsuccessful because removal of the galvanization coating from the spindles to restore the machine-finished surfaces proved to be a difficult and expensive procedure. Attempts at assembling wheel spindles to the remainder of the suspension system after its galvanization, moreover, were found to be deficient in that they necessitated re-machining after assembly to the remainder of the suspension assembly.

It is accordingly the principal object of this invention to provide a novel and improved method and means for hot dip galvanizing wheel suspension assemblies as a unit and thereby afford complete protection against rusting and significant corrosion without in any way affecting the prefinished machined surfaces of the wheel spindles.

It is another object of this invention to provide a method and means for effectively covering the machine-finished spindles of wheel suspension assemblies with a reusable sleeve cap to permit hot dip galvanizing of the suspension assembly as a unit without in any way affecting the prefinished machined surfaces of the spindles.

It is a more particular object of the invention to provide a wheel spindle protective cap of the character described that fits telescopingly over a wheel spindle and includes internal nut means for screwing upon the threaded end of a spindle to permit force-fitting the inner end of the sleeve cap against a sealing packing placed therebetween and an annular shoulder portion of the spindle.

Yet another object of the invention is to provide a method and means of hot dip galvanizing completed wheel suspension assemblies which will be simple in operation, economical in manufacture and efficient and dependable in operation.

Other objects, features and advantages of the invention will be apparent from the following description when read with reference to the accompanying drawings. In the drawings, wherein like reference numerals denote corresponding parts throughout the several views:

FIG. 1 illustrates, in plain view, a torsion bar suspension system for tandem wheels equipped with protective spindle caps embodying the invention in preparation for hot dip galvanizing;

FIG. 2 is a side view of the suspension system illustrated in FIG. 1; and

FIG. 3 is a longitudinal cross-sectional view, taken along the line 3—3 of FIG. 1, on an enlarged scale, illustrating constructional details of the protective spindle cap and the wheel spindle to which it is assembled.

Referring now in detail to the drawings, reference numeral 10 in FIGS. 1 and 2 designates a torsion bar suspension system for tandem trailer wheels, the spindles 11 of which are fitted with spindle protective sleeve caps 12 comprising the invention. Since the torsion bar suspension system 10 is described in detail in my United States patent referred to above, a detailed description is not deemed necessary herein for a full understanding of the present invention. In brief, it will be understood that the suspension system comprises a metal supporting framework 13 adapted to be secured to the undercarriage of a trailer, which supporting framework has, longitudinally fitted and secured therein, a pair of spaced, parallel torsion bars 14, 15, the outwardly projecting ends of which carry, respectively, laterally-opposed moment arm members 16, 16 and 17, 17. The outer ends of the moment arms 16, 16 and 17, 17 are formed with hub portions 18, each of which is provided with a spindle 11. It is further to be understood that assembly 10 will be appropriately jigged and bored to receive, press-fitted therein the machine finished spindles for proper wheel suspension when fitted to a trailer carriage frame. Upon galvanization, the inner ends of the spindles will be galvanize-welded to their respective moment arm members.

As best illustrated in FIG. 3, the protective sleeve caps 12 each comprise a tubular sleeve portion 19, one end of which is provided with a coaxial, internally threaded blind bore or nut portion 20 threadingly receivable on the externally threaded outer end 21 of a wheel spindle 11, said spindle thread being the ordinary threading provided for reception of the wheel-retainer nut upon subsequent assembly of the wheels to the suspension system. The outer or nut end of the sleeve portion 19 is further provided with an outwardly extending, solid, hexagonal lug portion 22 for co-operative fitting thereto of an impact wrench, as is hereinafter described. The inner end of the protective cap sleeve portion 19 is internally countersunk to provide an increased-diameter interior, annular wall portion 23 terminating in an inwardly inclined chamfer 24. The protective sleeve cap 12 can conveniently be fabricated either of solid steel stock, or assembled of appropriate lengths of steel tubing and hexagonal bar stock, welded together and internally bored, threaded and chamferred.

As further illustrated in FIG. 3, each of the wheel spindles 11 is formed with a cylindrical body support portion 25 of such diameter as to be press-fitted within a central, through bore 26 in its moment arm hub portion 18, whereat it is secured permanently in place, such as by means of a peripheral weld 27 at the outer end of said body support portion. The outwardly projecting portion of the spindle 11 is formed with a first reduced-diameter portion 28 defining an annular shoulder 29. The first reduced-diameter portion 28 extends into a still further reduced cylindrical portion 30 for reception of an inner wheel bearing and defining, with said first reduced-diameter portion, an annular shoulder 31. The annular shoulder 31 provides a slide surface for a grease seal ring fitted in place upon subsequent assembly of a trailer wheel to the spindle. The wheel spindle reduced-diameter cylindrical portion 30 extends into a third reduced-diameter portion 32 which, in turn, extends into a fourth reduced-diameter outer wheel bearing portion 33. The outer wheel bearing portion 33 terminates in the still further reduced, externally threaded wheel spindle outer end 21.

In use, a protective sleeve cap 12, as illustrated in FIG. 3, will be telescopingly fitted over a machine-finished wheel spindle and screw-threaded on the externally threaded outer end 21 thereof. The internal diameter of the annular wall portion 23 at the inner end of the protective sleeve cap 12 is such as to slide fit in embracing relation along the first reduced-diameter 28 of said spindle. The hexagonal lug portion 22 at the outer end of the protective sleeve cap 12 serves to be engaged by a power-driven impact wrench for driving said sleeve cap home against the annular shoulder 29 at the inner end of the wheel spindle 11.

To ensure heat resistant sealing action at the abutment zone, the annular recess defined by the chamfer 24 at the inner end of the protective sleeve cap 12 is packed with a packing of graphited asbestos just prior to power driving said sleeve cap home. After all of the wheel spindles of a prefabricated suspension system 10 have thus been fitted with protective sleeve caps 12, the assembly is ready for hot dip galvanizing in molten zinc at a temperature of about 800° F.

It is to be noted that despite the very high temperature to which the entrapped air within the protective sleeve caps 12 is subjected during the galvanizing process, the volumes of such entrapped air are so small as to keep pressures resulting from their expansion within safe limits.

After completion of the galvanizing process, the protective sleeve caps 12 can readily be removed, by use of a power-driven impact wrench, for subsequent reuse. Any galvanization coating between moving parts of the suspension system, such as the flexure zones between the inner ends of the moment arm members 16, 16; 17, 17 and outer end portions of the supporting framework 14, will readily be broken by normal movement of said moment arms with respect to said supporting framework. Since there will be intermittent sliding frictional contact at these zones during use of the trailer to which the suspension system 10 is subsequently assembled, rusting and corroding cannot take the place at these ungalvanized zones.

Upon assembly of the trailer wheels to the suspension spindles, grease seal rings in sliding contact with the annular shoulders 31 of each spindle, together with grease caps fitted to the outsides of the wheel hubs, prevents the escape of wheel bearing grease, while at the same time sealing against the entrance of water. The completely assembled, wheeled suspension system has thus been afforded complete protection against water damage, whether due to rusting or corrosion or a combination of both, and is therefore particularly well suited for long-wearing, dependable and maintenance free use in submersible type boat trailers.

While I have illustrated and described herein only one form in which my invention can conveniently be embodied in practice, it is to be understood that this form is given by way of example only and not in a limiting sense. The invention, in brief, comprises all the embodiments and modifications coming within the scope and spirit of the following claims.

What I claim as new and desire to secure by Letters Patent is:

1. The method of hot dip galvanizing suspension system for trailer wheels having wheel spindles machine-finished with annular shoulders at their inner ends and wheel retainer nut threading at their outer ends, comprising the steps of fitting a heat resistant packing member circumjacent each spindle at its shoulder, then screw-threading an internally tapped protective sleeve member over each spindle so that its inner end is clamped against its respective packing member and spindle shoulder, then hot dip galvanizing the suspension system thus fitted with protective sleeve caps, and finally removing said sleeve caps from their respective spindles.

2. The method of hot dip galvanizing suspension systems for trailer wheels as defined in claim 1 wherein said heat resistant packing members are of graphited asbestos.

3. The method of hot dip galvanizing suspension systems for trailer wheels as defined in claim 1 wherein the interior inner end of each sleeve member is formed with an inwardly inclined chamber for securely wedging their respective packing members in place.

4. The method of hot dip galvanizing suspension systems for trailer wheels as defined in claim 3 wherein said heat resistant packing members are of graphited asbestos.

* * * * *